(12) United States Patent
Blunier et al.

(10) Patent No.: US 8,833,481 B2
(45) Date of Patent: Sep. 16, 2014

(54) SYSTEM FOR CONTROLLING WING TOOL BARS OF AN AGRICULTURAL IMPLEMENT HAVING AN ANGLE SENSOR

(75) Inventors: Timothy R. Blunier, Danvers, IL (US); Timothy A. Olson, Shorewood, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/604,752

(22) Filed: Sep. 6, 2012

(65) Prior Publication Data
US 2014/0060868 A1   Mar. 6, 2014

(51) Int. Cl.
*A01B 5/00* (2006.01)
*A01B 49/02* (2006.01)

(52) U.S. Cl.
USPC .............................................. 172/311; 701/50

(58) Field of Classification Search
USPC ................. 172/311, 456; 111/14, 52; 701/50; 60/468, 469; 91/420
See application file for complete search history.

(56) References Cited

U.S. PATENT DOCUMENTS

| | | | |
|---|---|---|---|
| 3,242,657 A | 3/1966 | Larsen et al. |
| 3,576,227 A | 4/1971 | Lippl et al. |
| 3,738,682 A | 6/1973 | Ritter |
| 3,774,693 A | 11/1973 | Orthman |
| 4,030,551 A | 6/1977 | Boetto et al. |
| 4,056,149 A | 11/1977 | Honnold |
| 4,074,766 A | 2/1978 | Orthman |
| 4,088,346 A | 5/1978 | Schreiner et al. |
| 4,126,187 A | 11/1978 | Schreiner et al. |
| 4,319,643 A | 3/1982 | Carter et al. |
| 4,320,805 A | 3/1982 | Winter |
| 4,339,139 A | 7/1982 | Swanson |
| 4,355,690 A | 10/1982 | Jensen et al. |
| 4,562,779 A | 1/1986 | Briggs |
| 4,721,168 A | 1/1988 | Kinzenbaw |
| 5,213,165 A | 5/1993 | Dunn et al. |
| 5,488,996 A | 2/1996 | Barry et al. |
| 5,577,563 A | 11/1996 | Holen |
| 5,579,849 A | 12/1996 | Houck |
| 5,647,440 A | 7/1997 | Barry et al. |
| 5,687,798 A | 11/1997 | Henry et al. |
| 5,957,218 A | 9/1999 | Noonan et al. |
| 6,064,918 A | 5/2000 | Ohtsukasa et al. |
| 6,112,827 A | 9/2000 | Reiber et al. |

(Continued)

FOREIGN PATENT DOCUMENTS

| | | |
|---|---|---|
| GB | 1448284 A | 9/1976 |
| GB | 1531403 | 11/1978 |
| GB | 2133557 A | 7/1984 |

*Primary Examiner* — Árpád Fábián-Kovács
(74) *Attorney, Agent, or Firm* — Rebecca L. Henkel (57) ABSTRACT

System for controlling wing tool bars of an agricultural implement are provided. One implement includes a tool bar assembly having a central tool bar and a first wing tool bar rotatably coupled to an end of the central tool bar. The implement also includes a first actuator coupled to the first wing tool bar and to the central tool bar, and configured to raise and lower the first wing tool bar. The implement includes a solenoid controlled valve fluidly coupled to the first actuator. The implement also includes a switch electrically coupled to the valve. The switch measures an angle of the first wing tool bar relative to the central tool bar and is configured to transition the valve between a first and a second position based on an angle of the first wing tool bar relative to the central tool bar.

10 Claims, 6 Drawing Sheets

(56) References Cited

U.S. PATENT DOCUMENTS

| | | |
|---|---|---|
| 6,192,994 B1 | 2/2001 | Friggstad et al. |
| 6,220,366 B1 | 4/2001 | Noonan et al. |
| 6,293,352 B1 | 9/2001 | Hundeby et al. |
| 6,305,478 B1 | 10/2001 | Friggstad |
| 6,467,553 B1 * | 10/2002 | Wojanis ............... 172/812 |
| 6,494,154 B2 | 12/2002 | Kinzenbaw et al. |
| 6,675,907 B2 * | 1/2004 | Moser et al. .......... 172/311 |
| 6,988,363 B2 * | 1/2006 | Bitter ................... 60/468 |
| 7,073,604 B1 | 7/2006 | Dobson et al. |
| 7,134,227 B2 * | 11/2006 | Quenzi et al. .......... 37/274 |
| 7,175,133 B2 * | 2/2007 | Tanaka et al. ........ 244/99.4 |
| 7,182,146 B2 * | 2/2007 | Erickson et al. ...... 172/776 |
| 7,313,905 B2 | 1/2008 | Vaske et al. |
| 7,404,283 B2 | 7/2008 | Viaud |
| 7,478,683 B2 | 1/2009 | Peck et al. |
| 7,644,780 B2 * | 1/2010 | Harnetiaux et al. .... 172/130 |
| 8,271,164 B2 * | 9/2012 | Melanson et al. ....... 701/50 |
| 2009/0020298 A1 * | 1/2009 | Harnetiaux et al. ..... 172/1 |
| 2009/0101371 A1 * | 4/2009 | Melanson et al. ....... 172/6 |

* cited by examiner

SYSTEM FOR CONTROLLING WING TOOL BARS OF AN AGRICULTURAL IMPLEMENT HAVING AN ANGLE SENSOR

BACKGROUND

The invention relates generally to ground working equipment, such as agricultural equipment, and more specifically, to a system and method for controlling wing tool bars of an agricultural implement.

Generally, fertilizer application implements are towed behind a tractor or other work vehicle via a hitch assembly secured to a rigid frame of the implement. These fertilizer application implements typically include one or more ground engaging tools or openers that form a path for fertilizer deposition into the soil. The openers are used to break the soil, thereby enabling injection nozzles (e.g., positioned behind the openers) to deposit fertilizer at a desired depth beneath the soil surface. In certain embodiments, the implement may include knives (e.g., positioned behind the openers), instead of the injection nozzles, to flow the liquid fertilizer into respective trenches formed by the openers and the knives. Using such implements, fertilizer may be distributed throughout a field, either before or after planting, to facilitate enhanced crop development.

A fertilizer application implement may have various folded and/or unfolded positions to facilitate operation, transportation, and/or storage. For example, the fertilizer application implement may include a working position in which a tool bar of the implement is unfolded for applying fertilizer throughout the field. As another example, the fertilizer application implement may include a transport position in which the tool bar of the implement is folded for transportation and/or storage of the implement. Moreover, the fertilizer application implement may include a lifted position in which the tool bar is lifted so that ground engaging tools are removed from the soil, such as for turning the fertilizer application implement at the end of a row.

A current trend for fertilizer application implements, and other implements, is to increase the working position span. Increasing the span of a fertilizer application implement may facilitate distribution of fertilizer over a wider swath of soil, thereby distributing the fertilizer throughout a field at a faster rate. Unfortunately, as the span of the working position of the fertilizer application implement increases, lifting and/or folding the tool bar of the fertilizer application implement may become more difficult.

BRIEF DESCRIPTION

In one embodiment, an agricultural implement includes a tool bar assembly having a central tool bar and a first wing tool bar rotatably coupled to a first end of the central tool bar. The agricultural implement also includes a first actuator coupled to the first wing tool bar and the central tool bar, and configured to raise and lower the first wing tool bar relative to the central tool bar. The agricultural implement includes a solenoid controlled valve having a first position configured to enable fluid flow to the first actuator, and a second position configured to block fluid flow to the first actuator to raise the first wing tool bar relative to the central tool bar. The agricultural implement also includes a switch electrically coupled to the solenoid controlled valve and configured to transition the solenoid controlled valve between the first and second positions based on an angle of the first wing tool bar relative to the central tool bar.

In another embodiment, a method for lifting wing tool bars of an agricultural implement includes receiving a fluid at an input port of a fluid control system. The fluid is configured to induce raising a central tool bar of the agricultural implement using a first actuator extending between the central tool bar and a main frame of the agricultural implement, and then to induce rotating a first wing tool bar relative to the central tool bar using a second actuator extending between the first wing tool bar and the central tool bar after the central tool bar is raised. The method also includes detecting an angle between the first wing tool bar and the central tool bar using a switch. The method includes controlling fluid flow of the second actuator based on the detected angle via a solenoid controlled valve electrically coupled to the switch.

In a further embodiment, a method for folding wing tool bars of an agricultural implement includes receiving a fluid at a first input port of a fluid control system. The fluid is configured to induce raising a central tool bar of the agricultural implement using a first actuator. The method also includes detecting a fluid pressure of the fluid and opening a valve to enable the fluid to flow to a second actuator extending between a first wing tool bar and the central tool bar while the detected fluid pressure is greater than a threshold pressure to fold the first wing tool bar from a working position to a transport position.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
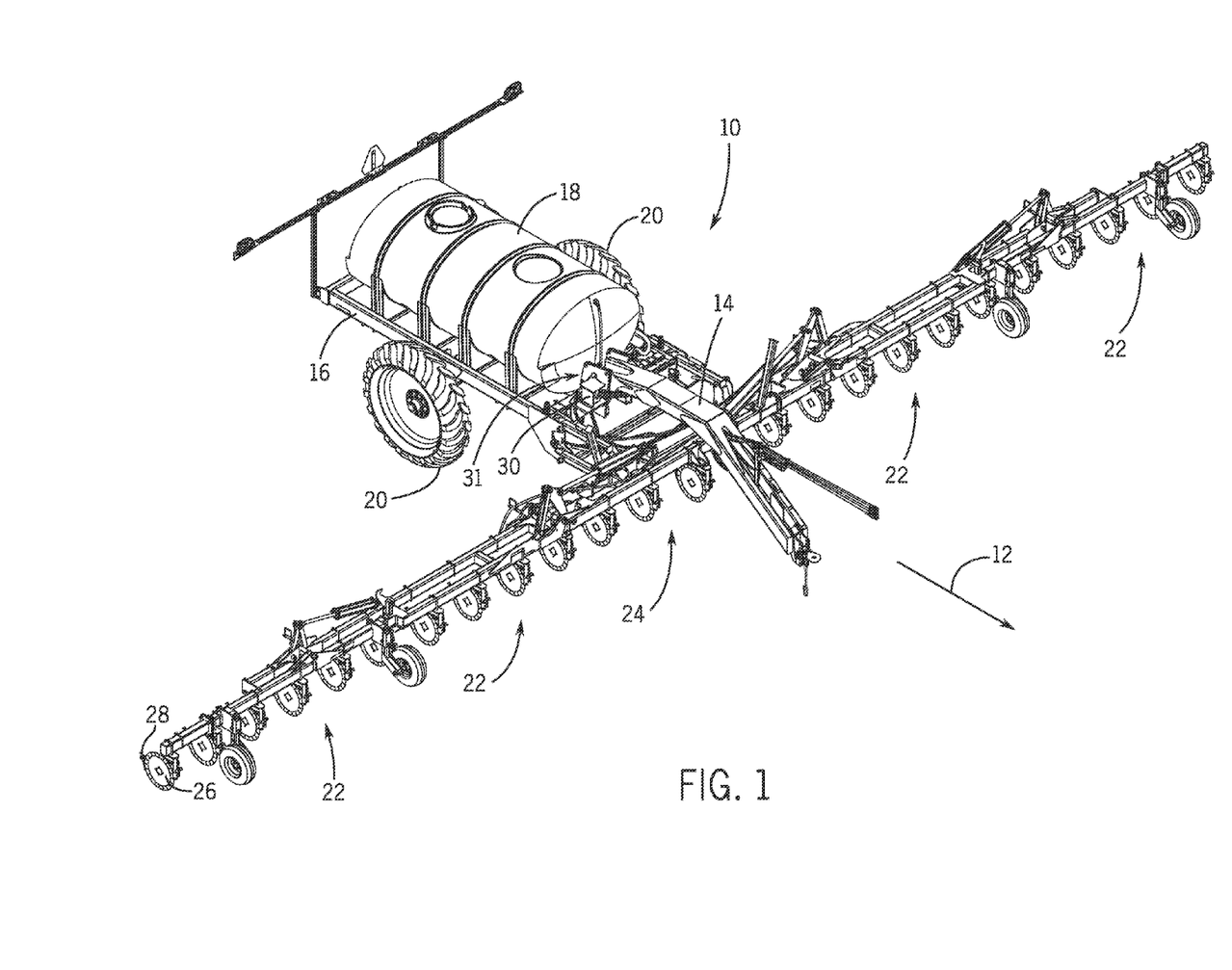
FIG. 1 is a perspective view of an embodiment of an agricultural implement including a tool bar assembly having multiple wings in a working position.

FIG. 1 is a perspective view of an embodiment of an agricultural implement 10 including a tool bar assembly having multiple wings in a working position. In the illustrated embodiment, the implement 10 is configured to be towed along a direction of travel 12 by a work vehicle, such as a tractor or other prime mover. The work vehicle may be coupled to the implement 10 by a hitch assembly 14, such as the illustrated "goose neck" pull frame. As illustrated, the hitch assembly 14 is coupled to a main frame 16 of the implement 10 to facilitate towing of the implement 10 in the direction of travel 12. In the illustrated embodiment, the main frame 16 supports a storage tank 18 configured to house a flowable agricultural product, such as liquid fertilizer. A pair of wheels 20 coupled to the main frame 16 is configured to support the weight of the frame 16, the storage tank 18, and the flowable agricultural product, thereby enabling the implement 10 to be towed across the field.

The implement 10 is configured to transfer the flowable agricultural product from the storage tank 18 to multiple row units 22 of a tool bar assembly 24 having a central tool bar, a first wing tool bar, a second wing tool bar, a third wing tool bar, and a fourth wing tool bar. Each row unit 22 includes a ground engaging tool 26 configured to break the soil, thereby excavating a trench into the soil. An injection nozzle 28 or knife (e.g., positioned behind the ground engaging tool) is configured to deposit flowable agricultural product from the storage tank 18 into the trench formed by the ground engaging tool 26. In certain embodiments, the penetration depth of the ground engaging tools 26 is adjustable to facilitate deposition of the agricultural product at a desired depth beneath the soil surface. Accordingly, a flowable agricultural product, such as liquid fertilizer, may be distributed throughout a field, either before or after planting, to facilitate enhanced crop development.

While the illustrated implement 10 includes 25 row units 22, it should be appreciated that alternative implements may include more or fewer row units 22. In addition, the number of row units and the spacing between row units may be particularly selected to correspond to the arrangement of row units on respective seeding or planting implements. For example, the implement 10 may include 25 row units 22 spaced 30 inches from one another. Accordingly, as the implement 10 is towed across a field, the row units 22 deposit fertilizer in rows having 30-inch spacing. After the fertilizer is applied, a seeding or planting implement (e.g., having row units spaced 30 inches from one another) may deposit seeds between the rows of fertilizer (e.g., at the approximate midpoint between rows), thereby facilitating enhanced crop development. In addition, the implement 10 may be utilized to apply fertilizer to previously planted seeds (e.g., via injecting fertilizer between rows of the previously planted seeds).

As discussed above, the tool bar assembly 24 includes multiple tool bar sections, such as the central tool bar, inner wing tool bars (e.g., the first wing tool bar and the third wing tool bar), and outer wing tool bars (e.g., the second wing tool bar and the fourth wing tool bar). In the illustrated embodiment, the agricultural implement 10 is in a working position to facilitate distribution of fertilizer throughout a field. The agricultural implement 10 includes a fluid control system 30 (e.g., hydraulic control system) that is covered by a housing 31, as illustrated. The housing 31 blocks contaminants, such as dust, water, fertilizer, and so forth, from flowing into an interior of the housing 31, thereby enhancing the longevity of components within the fluid control system 30. As may be appreciated, the fluid control system 30 includes a combination of valves for directing fluid (e.g., hydraulic fluid) to actuators of the agricultural implement 10. Moreover, the agricultural implement 10 may include a sensor (e.g., switch) positioned between adjacent tool bar sections to detect an angle between the adjacent tool bar sections when lifting the tool bar sections. After the sensor detects that the adjacent tool bar sections have reached a predetermined angle, the fluid control system 30 may adjust fluid flow to control the actuators of the agricultural implement 10. As a result, the tool bars may be lifted to a desired height above the soil surface for turning the agricultural implement 10. Furthermore, the fluid control system 30 may be configured control folding the tool bar assembly 24 by performing multiple folding steps via a single control input.

Figure 2:
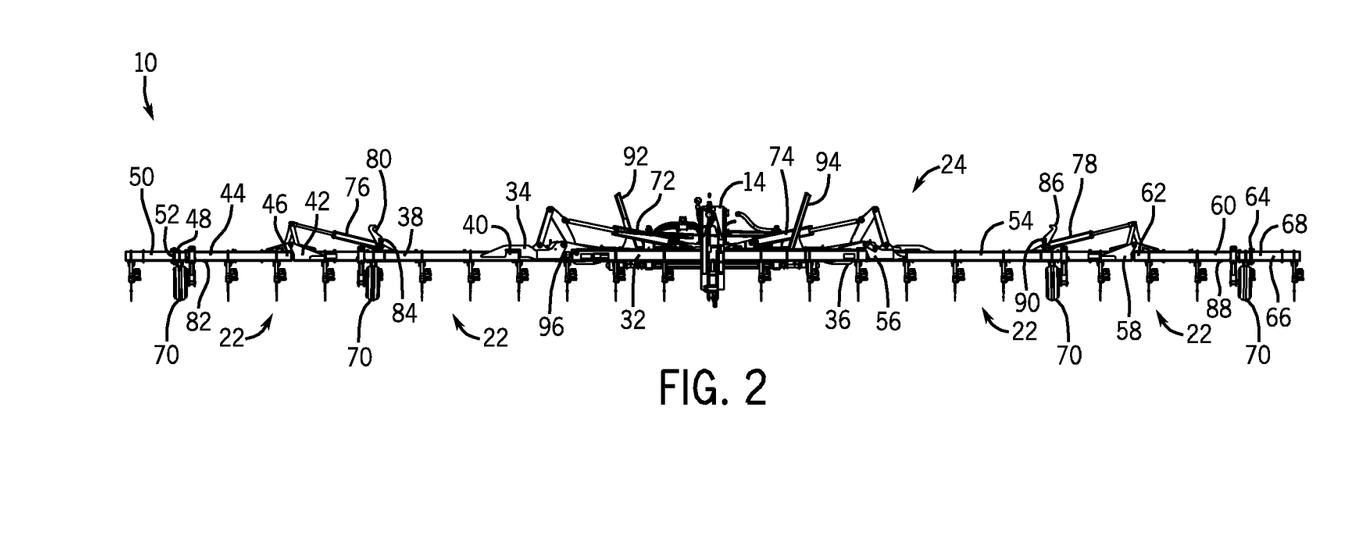
FIG. 2 is a front view of the agricultural implement of FIG. 1 having a switch for detecting an angle between sections of the tool bar assembly.

FIG. 2 is a front view of the agricultural implement 10 of FIG. 1 having a switch for detecting an angle between sections of the tool bar assembly. As illustrated, the tool bar assembly 24 includes a central section and four wing sections. Specifically, the tool bar assembly 24 includes a central tool bar 32 having a first end 34 and a second end 36. The first end 34 of the central tool bar 32 is rotatably coupled to a first wing tool bar 38. The first wing tool bar 38 includes a first end 40 and a second end 42. As illustrated, the first end 34 of the central tool bar 32 is rotatably coupled to the first end 40 of the first wing tool bar 38. Moreover, the second end 42 of the first wing tool bar 38 is rotatably coupled to a second wing tool bar 44. The second wing tool bar 44 also includes a first end 46 and a second end 48. The second end 42 of the first wing tool bar 38 is rotatably coupled to the first end 46 of the second wing tool bar 44. The second end 48 of the second wing tool bar 44 is coupled to a first tool bar extension 50. Specifically, the second end 48 of the second wing tool bar 44 is rigidly and non-rotatably coupled to an end 52 of the first tool bar extension 50.

The second end 36 of the central tool bar 32 is rotatably coupled to a third wing tool bar 54. The third wing tool bar 54 includes a first end 56 and a second end 58. As illustrated, the second end 36 of the central tool bar 32 is rotatably coupled to the first end 56 of the third wing tool bar 54. Moreover, the second end 58 of the third wing tool bar 54 is rotatably coupled to a fourth wing tool bar 60. The fourth wing tool bar 60 also includes a first end 62 and a second end 64. The second end 58 of the third wing tool bar 54 is rotatably coupled to the first end 62 of the fourth wing tool bar 60. The second end 64 of the fourth wing tool bar 60 is rigidly coupled to a second tool bar extension 66. Specifically, the second end 64 of the fourth wing tool bar 60 is rigidly and non-rotatably coupled to an end 68 of the second tool bar extension 66.

While the tool bar assembly 24 of the present embodiment includes five sections, in other embodiments, the tool bar assembly 24 may include any suitable number of sections (e.g., one or more). As may be appreciated, depending on the number of sections of the tool bar assembly 24, any of the ends 34, 36, 42, 48, 58, and 64 of the tool bars may be considered distal ends of the tool bar assembly 24. As illustrated, wheel assemblies 70 are coupled to the tool bar assembly 24 to facilitate movement of the agricultural implement 10 through a field. Specifically, wheel assemblies 70 are coupled to the first wing tool bar 38, to the second wing tool bar 44, to the third wing tool bar 54, and to the fourth wing tool bar 60. However, in the illustrated embodiment, wheel assemblies 70 (e.g., wheels) are not coupled to the tool bar extensions 50 and 66.

The agricultural implement 10 includes actuators 72, 74, 76, and 78 to transition the tool bar assembly 24 between the working position and a transport position by raising and/or lowering the tool bar wings attached to the actuators 72, 74, 76, and 78. For example, the actuators 72, 74, 76, and 78 may be configured to fold the tool bar assembly 24 from the working position to the transport position, and/or to unfold the tool bar assembly 24 from the transport position to the working position. The actuators 72, 74, 76, and 78 may include any suitable actuating device, such as the illustrated hydraulic cylinders or, electric motors, pneumatic devices, and so forth. Further, while the actuators 72, 74, 76, and 78 in the present embodiment are controlled hydraulically, in other embodiments, the actuators 72, 74, 76, and 78 may be controlled pneumatically, electronically, and so forth. As may be appreciated, the actuators 72, 74, 76, and 78 may also lift the wing sections above a surface of a field, such as for turning the implement at a headland. Moreover, the agricultural implement 10 also includes actuators mounted to the tool bar assembly 24 for raising and/or lowering the complete tool bar assembly 24. As illustrated, the agricultural implement 10 is in the working position. By having five different tool bar sections, the agricultural implement 10 may provide flowable agricultural product to a wider swath of soil than an agricultural implement 10 with fewer tool bar sections.

As illustrated, the agricultural implement 10 includes a sensor 96 (e.g., switch, micro switch, etc.) configured to detect an angle between the central tool bar 32 and the first wing tool bar 38. In certain embodiments, the sensor 96 may detect the angle between the central tool bar 32 and the first wing tool bar 38 based on the proximity of an element of the central tool bar 32 to an element of the first wing tool bar 38. For example, the sensor 96 may be a micro switch that is actuated when the first wing tool bar 38 is folded to a predetermined angle relative to the central tool bar 32. As may be appreciated, the predetermined angle may be adjustable to facilitate detection of a desired angle. As explained in detail below, the sensor 96 facilitates lifting the tool bars with greater height consistency, thereby facilitating improved efficiency during operation and reducing the possibility of contact with the ground and/or crops.

Figure 3:
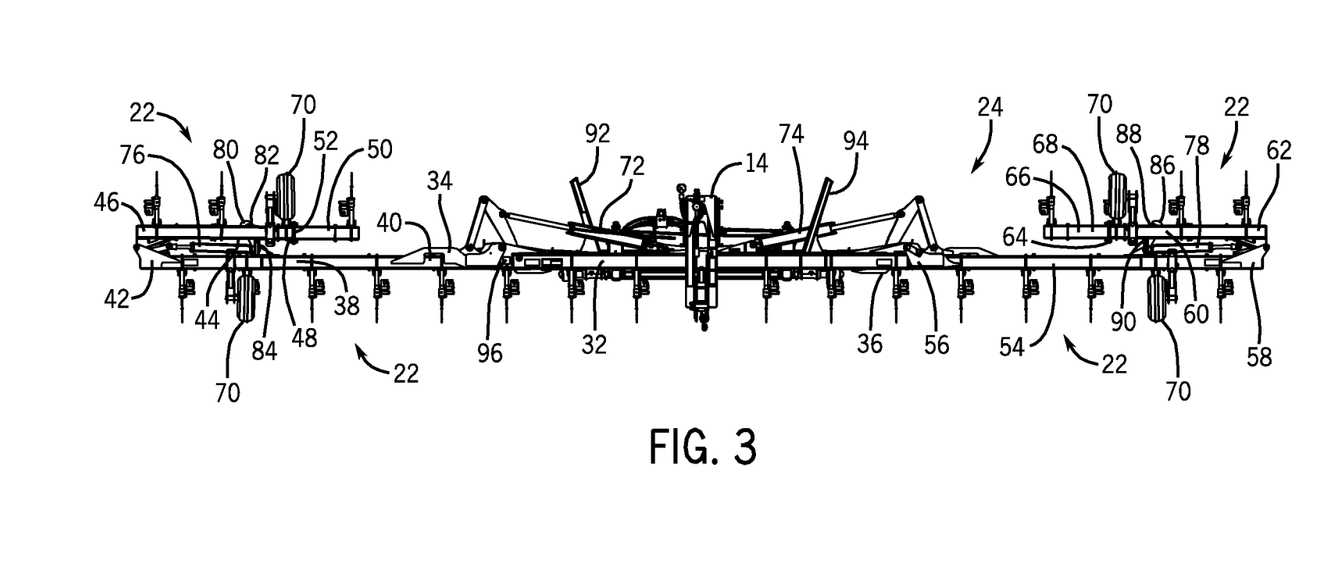
FIG. 3 is a front view of the agricultural implement of FIG. 2 with the tool bar assembly in an intermediate folded position.

FIG. 3 is a front view of the agricultural implement 10 of FIG. 2 with the tool bar assembly 24 in an intermediate folded position. To facilitate transition of the agricultural implement 10 from the working position to the intermediate folded position, the actuator 76 induces the second wing tool bar 44 to fold over the first wing tool bar 38. The first wing tool bar 38 includes a latch 80 that hooks onto a pin 82 of the second wing tool bar 44 to hold the second wing tool bar 44 to the first wing tool bar 38. As may be appreciated, any suitable mechanism may be used to hold the first wing tool bar 38 and the second wing tool bar 44 together. As illustrated, a spacer 84 on the first wing tool bar 38 maintains a gap between the first wing tool bar 38 and the second wing tool bar 44 when folded.

Moreover, the actuator 78 induces the fourth wing tool bar 60 to fold over the third wing tool bar 54. It should be noted that the actuator 78 may be actuated at the same time as the actuator 76, or at a different time (e.g., before or after). The third wing tool bar 54 includes a latch 86 that hooks onto a pin 88 of the fourth wing tool bar 60 to hold the fourth wing tool bar 60 to the third wing tool bar 54. As may be appreciated, any suitable mechanism may be used to hold the third wing tool bar 54 and the fourth wing tool bar 60 together. As illustrated, a spacer 90 on the third wing tool bar 54 maintains a gap between the third wing tool bar 54 and the fourth wing tool bar 60 when folded.

It should be noted that the agricultural implement 10 may transition from the intermediate folded position to the working position in a similar manner as described (e.g., such as in a reverse order). In certain embodiments, the agricultural implement 10 may provide a flowable agricultural product to the field while in the intermediate folded position. In such embodiments, the agricultural implement 10 may provide flowable agricultural product to a smaller swath of soil than when the agricultural implement 10 is in the working position. As may be appreciated, providing flowable agricultural product to a smaller swath of soil may also be desirable when using planters of certain widths (e.g., a 24 row planter, a 16 row planter, etc.). Accordingly, the same agricultural implement 10 may be used to match different planter widths.

Figure 4:
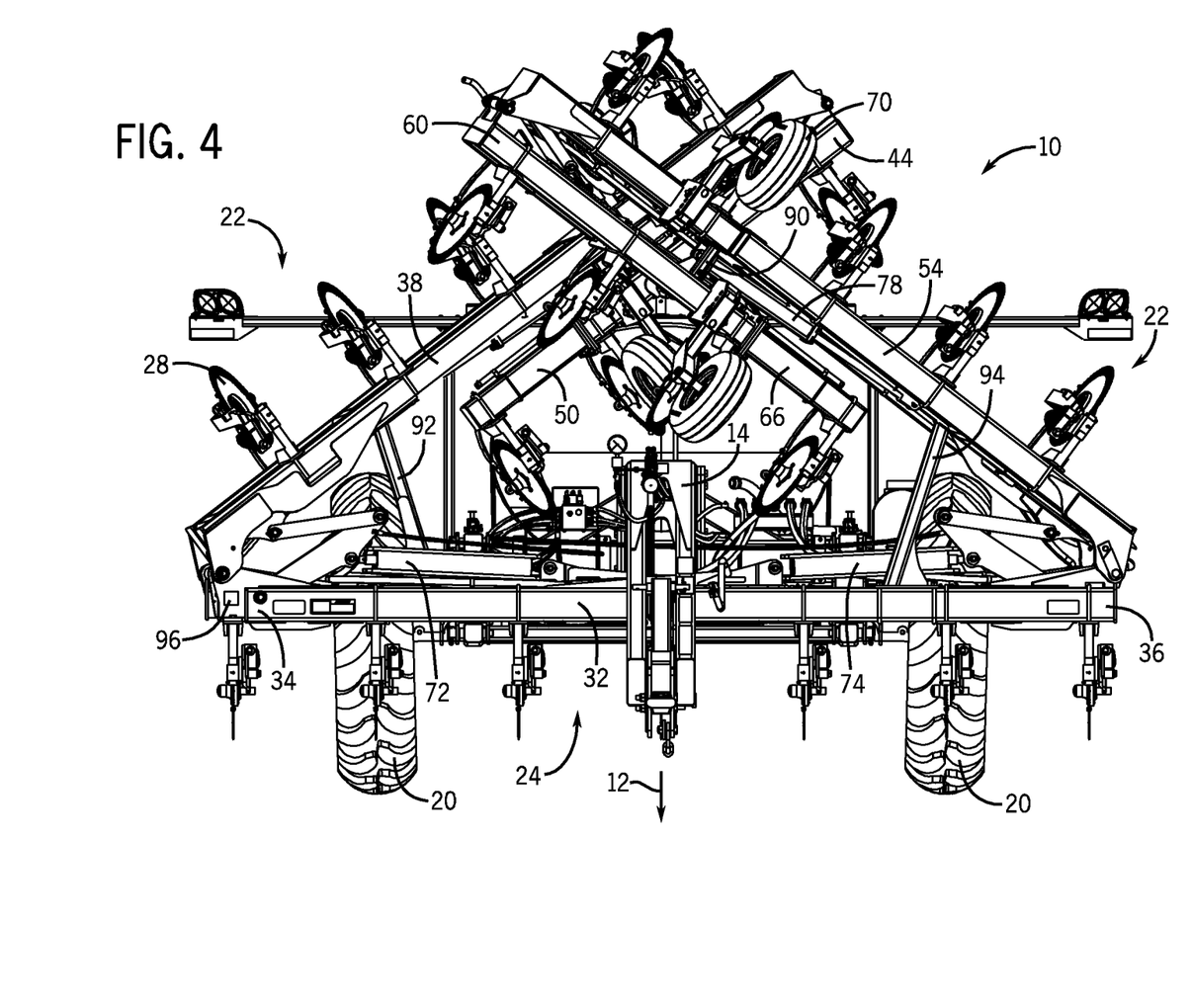
FIG. 4 is a front view of the agricultural implement of FIG. 2 with the tool bar assembly in a transport position.

FIG. 4 is a front view of the agricultural implement 10 of FIG. 2 with the tool bar assembly 24 in the transport position. To facilitate transition of the tool bar assembly 24 from the intermediate folded position to the transport position, the actuator 72 induces the first wing tool bar 38 to fold over the central tool bar 32. As illustrated, the central tool bar 32 includes a first support bar 92 to hold the first wing tool bar 38 over the central tool bar 32 at a desired orientation. The first support bar 92 also supports the combined weight of the first and second wing tool bars 38 and 44. Moreover, the actuator 74 induces the third wing tool bar 54 to fold over the central tool bar 32. Further, the central tool bar 32 includes a second support bar 94 to hold the third wing tool bar 54 over the central tool bar 32 at a desired orientation. The second support bar 94 also supports the combined weight of the third and fourth wing tool bars 54 and 60. The first wing tool bar 38 and the third wing tool bar 54 are folded crosswise over the central tool bar 32. It should be noted that the agricultural implement 10 may transition from the transport position to the intermediate folded position in a similar manner as described (e.g., such as in a reverse order).

Figure 5:
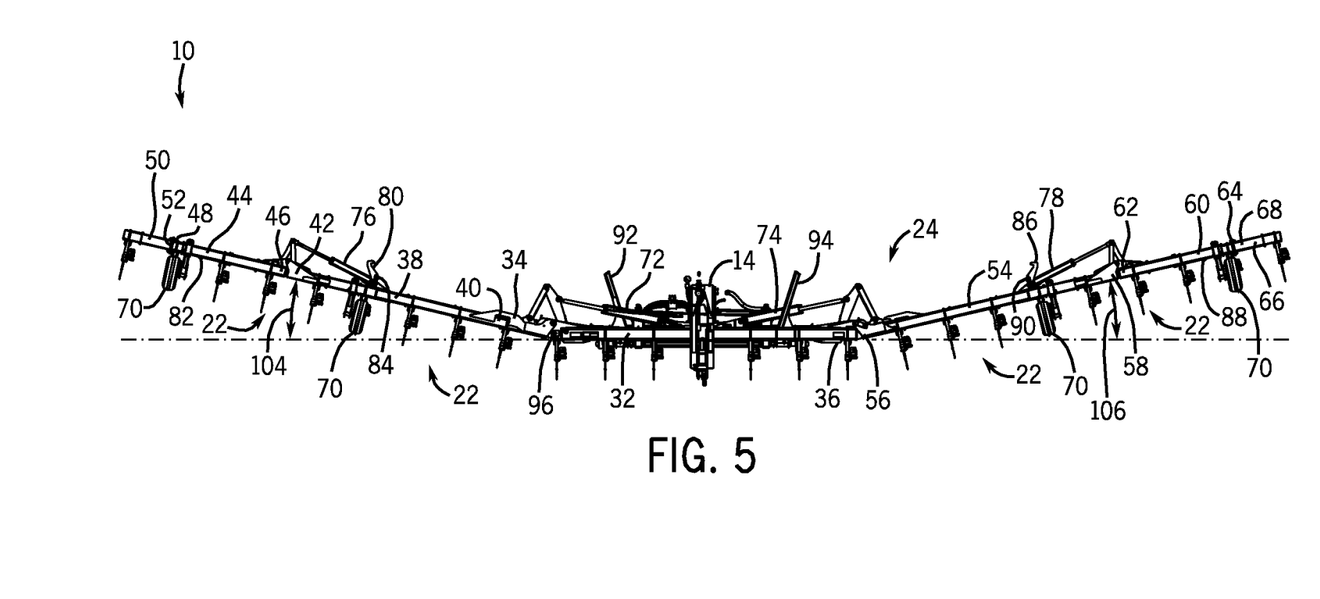
FIG. 5 is a front view of the agricultural implement of FIG. 2 with the tool bar assembly in a lifted position.

FIG. 5 is a front view of the agricultural implement 10 of FIG. 2 with the tool bar assembly 24 in a lifted position. In the lifted position, the tool bar assembly 24 may be positioned above the soil surface such that the ground engaging tools 22 disengage the soil. Moreover, the first wing tool bar 38 and the second wing tool bar 44 are rotated relative to the central tool bar 32 by an angle 104. Further, the third wing tool bar 54 and the fourth wing tool bar 60 are rotated relative to the central tool bar 32 by an angle 106. Accordingly, the tool bar assembly 24 is lifted above a surface of a field such that the ground engaging tools 22 do not interfere with the crops, such as while turning the agricultural implement 10. Moreover, the agricultural implement 10 includes the sensor 96 to facilitate detecting the angle 104. A signal from the sensor 96 may be used to control whether fluid flows to the actuators 72, 74, 76, and 78, as discussed in detail below. Accordingly, the actuators 72, 74, 76, and 78 may be controlled to position the first wing tool bar 38 and the second wing tool bar 44 at a desired angle. Furthermore, the actuators 72, 74, 76, and 78 may be controlled to position the third wing tool bar 54 and the fourth wing tool bar 60 at a desired angle.

Figure 6:
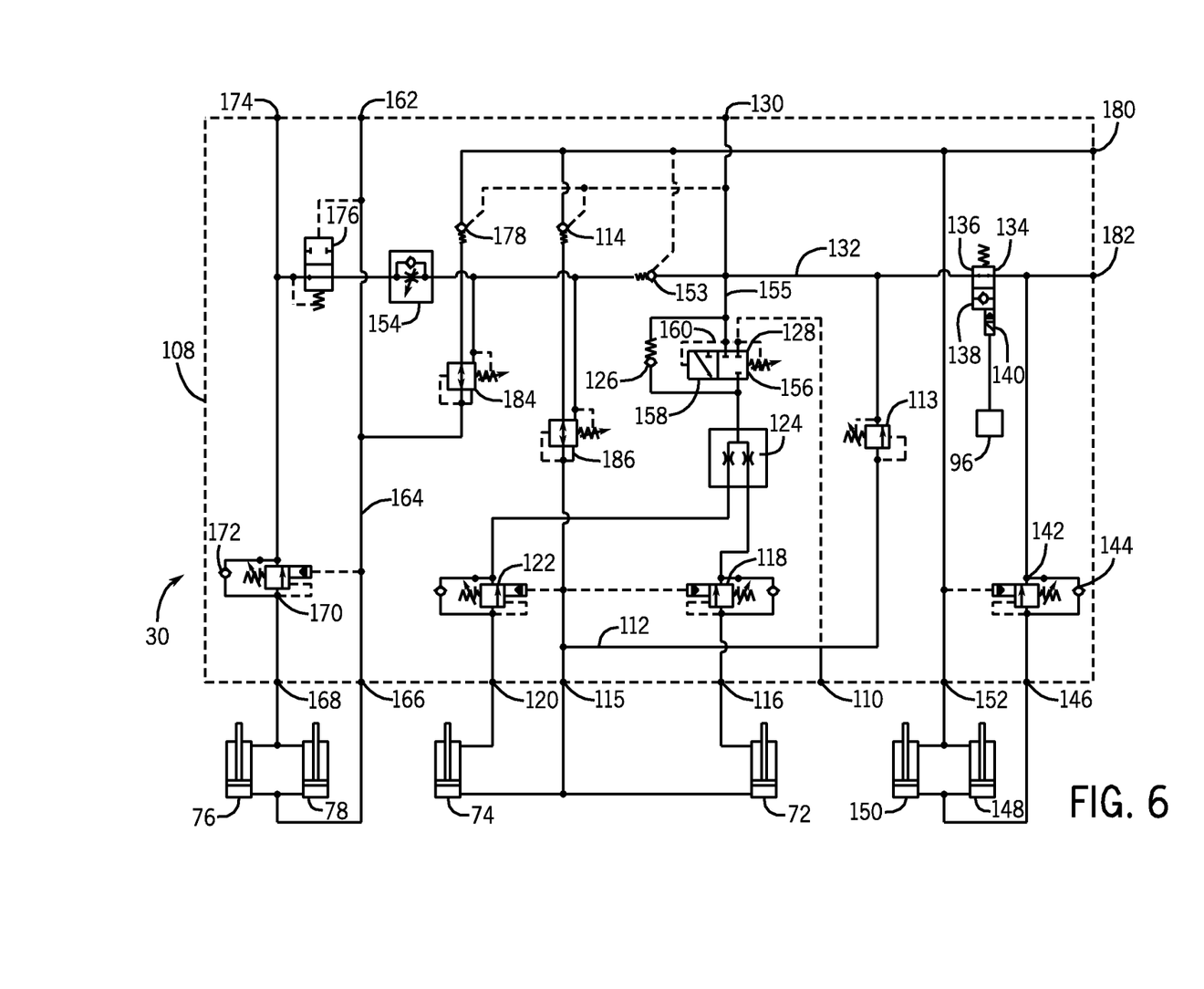
FIG. 6 is a schematic view of an embodiment of a fluid control system configured to move sections of a tool bar assembly.

FIG. 6 is a schematic view of an embodiment of circuitry 108 (e.g., hydraulic circuitry) of the fluid control system 30 configured to move sections of the tool bar assembly 24. In certain embodiments, the circuitry 108 may include valving disposed within the housing of the fluid control system 30. The fluid control system 30 may be configured to receive fluid from a tow vehicle (e.g., tractor) control mechanism that controls fluid flow to the fluid control system 30. For example, one or more fluid conduits may extend from the tow vehicle to supply fluid to the circuitry 108. In some embodiments, the agricultural implement 10 may be coupled to a fluid supply that is not supplied via the tow vehicle.

The circuitry 108 is configured to rotate the first wing tool bar 38 and the third wing tool bar 54 relative to the central tool bar 32 to respective unfolded positions when fluid is received through an inner wing unfolding port 110. When fluid enters the inner wing unfolding port 110, the fluid flows through a conduit 112. Fluid flow is blocked by a relief valve 113 and a check valve 114. The relief valve 113 is configured to block fluid flow unless sufficient fluid pressure is applied to a pilot of the relief valve 113 via fluid in the conduit 112. If the fluid pressure is less than the pressure sufficient to open the valve 113, fluid flow is directed out of the fluid control system 30 through a port 115. The fluid then flows to actuators 72 and 74 to direct the actuators 72 and 74 to unfold the first wing tool bar 38 and the third wing tool bar 54 relative to the central tool bar 32. As illustrated, each of the actuators 72 and 74 is a double-acting cylinder that are used to rotate the first wing tool bar 38 and the third wing tool bar 54 between folded and unfolded positions. As may be appreciated, when fluid enters the actuators 72 and 74 via the port 115, a rod of each of the actuators 72 and 74 extends and urges the first wing tool bar 38 and the third wing tool bar 54 toward the unfolded (e.g., working) position.

As the rod of each of the actuators 72 and 74 extends, fluid exits an opposite end of the actuators 72 and 74. Specifically, fluid exiting the actuator 72 flows into the fluid control system 30 via a port 116 toward a counterbalance valve 118, and fluid exiting the actuator 74 flows into the fluid control system 30 via a port 120 toward a counterbalance valve 122. In certain embodiments, the counterbalance valves 118 and 122 are closed until sufficient pressure builds up in the conduit 112 to open the counterbalance valves 118 and 122 via pilot connections. From the counterbalance valves 118 and 122, fluid flows to a flow divider-combiner 124. The flow divider-combiner 124 combines the two flow paths from the counterbalance valves 118 and 122, and maintains even flow through the counterbalance valves 118 and 122. From the flow divider-combiner 124, fluid passes through the check valve 126, and bypasses a pressure sequencing valve 128 to flow out of the inner wing folding port 130 and toward a fluid supply.

The circuitry 108 may also be used to fold the first wing tool bar 38 and the third wing tool bar 54 from the unfolded position to the folded position. To fold the first wing tool bar 38 and the third wing tool bar 54, fluid is provided to the inner wing folding port 130. In certain embodiments, it may be desirable to raise the central tool bar 32 prior to folding the first wing tool bar 38 and the third wing tool bar 54 to reduce the potential for contact between portions of the agricultural implement 10. Accordingly, when fluid flows through the inner wing folding port 130, a portion of the fluid flows through a conduit 132 toward a solenoid controlled valve 134 to raise the central tool bar 32 before folding the first wing tool bar 38 and the third wing tool bar 54. The solenoid controlled valve 134 includes a first position 136 and a second position 138. The first position 136 facilitates bidirectional fluid flow through the solenoid controlled valve 134, while the second position 138 facilitates unidirectional fluid flow through the solenoid controlled valve 134 using a check valve. Moreover, the solenoid controlled valve 134 is configured to transition from the first position 136 to the second position 138 when a solenoid 140 is energized. In the illustrated embodiment, the solenoid 140 is energized by the sensor 96, which is electrically coupled to the solenoid 140, as explained in detail below.

In either the first position 136 or the second position 138, fluid is enabled to flow from the conduit 132 through the solenoid controlled valve 134. From the solenoid controlled valve 134, fluid flows toward a counterbalance valve 142, but bypasses the counterbalance valve 142 by flowing through a check valve 144. The fluid then exits the fluid control system 30 via a port 146, and flows toward actuators 148 and 150. The actuators 148 and 150 are double acting hydraulic cylinders that raise the tool bar assembly 24 when fluid enters the head end of the cylinders. As may be appreciated, the fluid control system 30 may be configured to extend the actuators 148 and 150 to urge the tool bar assembly 24 away from the soil. As the rods of the actuators 148 and 150 extend, fluid exits the actuators 148 and 150. The fluid re-enters the fluid control system 30 through a port 152 and returns to the fluid supply.

Fluid that enters the fluid control system 30 through the inner wing folding port 130 flows through a check valve 153 toward a restrictor 154. The restrictor 154 enables a limited amount of fluid to flow toward circuitry used to fold the second wing tool bar 44 and the fourth wing tool bar 60. Moreover, fluid that enters the fluid control system 30 through the inner wing folding port 130 also flows toward the pressure sequencing valve 128 via a conduit 155. As illustrated, the pressure sequencing valve 128 includes a first position 156 and a second position 158. The first position 156 is configured to block fluid flow through the pressure sequencing valve 128, while the second position 158 is configured to enable fluid flow through the pressure sequencing valve 128. The check valve 126 and the pressure sequencing valve 128 block fluid from flowing to the flow divider-combiner 124 while the pressure sequencing valve 128 is in the first position 156. After the tool bar assembly 24 is raised by the actuators 148 and 150, fluid pressure through the conduit 155 increases. After pressure applied to a pilot line 160 increases over a predetermined threshold (e.g., 1,700 psi), the pressure sequencing valve 128 transitions to the second position 158, thereby enabling fluid to flow through the pressure sequencing valve 128 toward the flow divider-combiner 124. In other words, the pressure sequencing valve 128 blocks fluid flow to actuators 72 and 74 until the tool bar assembly 24 has been raised, thereby reducing contact between parts of the agricultural implement 10 that may result if the tool bar assembly 24 is not raised. After fluid enters the flow divider-combiner 124, the flow divider-combiner 124 substantially equally divides the fluid into two flow paths. The flow paths provide fluid to the actuators 72 and 74 to fold the first wing tool bar 38 and the third wing tool bar 54.

The fluid control system 30 may be used to unfold the second wing tool bar 44 and the fourth wing tool bar 60. To unfold the second wing tool bar 44 and the fourth wing tool bar 60, fluid is provided to the fluid control system 30 through an outer wing unfolding port 162. The fluid flows through a conduit 164 and out the fluid control system 30 through a port 166. The fluid then flows into the actuators 76 and 78, and directs a rod of each actuator 76 and 78 to extend, thereby rotating the second wing tool bar 44 and the fourth wing tool bar 60 to the unfolded position. As may be appreciated, a minimum threshold pressure (e.g., 2,200 psi) may be applied to the actuators 76 and 78 to induce the second wing tool bar 44 and the fourth wing tool bar 60 begin to unfold. Once the threshold pressure is achieved, the second wing tool bar 44 and the fourth wing tool bar 60 are unfolded to respective unfolded positions. As the rods of the actuators extend, fluid re-enters the fluid control system 30 through a port 168 and flows to a counterbalance valve 170. The counterbalance valve 170 and a check valve 172 block fluid flow until fluid pressure within the conduit 164 decreases below a threshold value, when fluid within the conduit 164 is pressurized to the pressure sufficient to rotate the second wing tool bar 44 and the fourth wing tool bar 60, the counterbalance valve 170 is opened via a pilot connection to the conduit 164, thereby enabling fluid to pass through the counterbalance valve 170, and flow back to the fluid supply via an outer wing folding port 174. Additionally, once fluid within the conduit 164 has reached threshold sufficient pressure to unfold the wings, a pilot coupled to a pressure sequencing valve 176 directs the pressure sequencing valve 176 to block fluid flow and direct fluid out of the outer wing folding port 174. Moreover, a check valve 178 also blocks fluid flow from the conduit 164.

The hydraulic circuit 42 also may be used to fold the second wing tool bar 44 and the fourth wing tool bar 60 when fluid is provided to the fluid control system 30 via the outer wing folding port 174. The fluid provided to the outer wing folding port 174 bypasses the counterbalance valve 170 by flowing through the check valve 172. The fluid then flows out of the fluid control system 30 to the actuators 76 and 78 through the port 168. As may be appreciated, by entering the actuators 76 and 78 via the port 168, the fluid urges the rods of the actuators 76 and 78 to retract, thereby rotating the second wing tool bar 44 and the fourth wing tool bar 60 into respective folded positions. As the rods of the actuators 76 and 78 retract, fluid flows from the actuators 76 and 78 into the flow control system 30 through the port 166. The fluid then flows through the conduit 164, and out of the fluid control system 30 via the port 162.

Additionally, the fluid control system 30 may apply a downward force independently of tool bar position. To lower the tool bar assembly 24 and/or to provide downward forces, fluid may be provided to the fluid control system 30 via a bar lowering port 180. A first portion of the fluid entering the bar lowering port 180 flows through the port 152 to lower the tool bar assembly 24 using the actuators 148 and 150. The fluid directs the rods of the actuators 148 and 150 to retract, thereby urging the central tool bar 32 downwardly. As the piston rods retract, the fluid returns to the fluid supply through a bar raising port 182. A second portion of fluid entering the bar lowering port 180 flows through the check valve 178 to a pressure reducing valve 184. The pressure reducing valve 184 limits fluid pressure to a predetermined value (e.g., 650 psi) by siphoning off and returning a portion of the fluid to the fluid supply. The reduced fluid pressure is provided to the actuators 76 and 78. Accordingly, a downward force is provided to the second wing tool bar 44 and the fourth wing tool bar 60 via respective actuators 76 and 78.

As may be appreciated, the downward force provided to the second wing tool bar 44 and the fourth wing tool bar 60 is applied in the same direction as the force for unfolding the wings. However, due to the limited pressure of fluid flowing through the pressure reducing valve 184, the fluid pressure may be less than the threshold pressure (e.g., 2,200 psi) for unfolding the second wing tool bar 44 and the fourth wing tool bar 60. Accordingly, the pressure reducing valve 184 facilitates applying the downward force to the second wing tool bar 44 and the fourth wing tool bar 60 when the tool bars are in the unfolded position, but the pressure is insufficient to rotate the second wing tool bar 44 and the fourth wing tool bar 60 to unfolded positions from the respective folded positions. Accordingly, the downward force may be applied to the tool bar assembly 24 without unfolding the second wing tool bar 44 and the fourth wing tool bar 60 when fluid is provided through the bar lowering port 180.

Similar to the second portion, a third portion of the fluid entering the bar lowering port 180 flows through the check valve 114 to a pressure reducing valve 186. The pressure reducing valve 186 limits fluid pressure to a predetermined value (e.g., 650 psi) by siphoning off and returning a portion of the fluid to the fluid supply. The reduced fluid pressure is provided to the actuators 72 and 74. Accordingly, a downward force provided to the first wing tool bar 38 and the third wing tool bar 54 via respective actuators 72 and 74 is limited by the pressure reducing valve 186. The reduced fluid pressure is less than the threshold pressure (e.g., 2,200 psi) sufficient to rotate the first wing tool bar 38 and the third wing tool bar 54 into respective unfolded positions. Accordingly, downward force may be applied when the first wing tool bar 38, the second wing tool bar 44, the third wing tool bar 54, and the fourth wing tool bar 60 are in the folded position as illustrated in FIG. 4.

The fluid control system 30 may also be used to raise the tool bar assembly 24, such as at a headland, to provide the ground engaging tools 22 clearance over the surface of the soil. For example, the central tool bar 32 may be raised, and the first wing tool bar 38, the second wing tool bar 44, the third wing tool bar 54, and the fourth wing tool bar 60 may be slightly folded so that the tool bars are lifted above the soil surface. To raise the tool bar assembly 24 and slightly lift the wing tool bars, fluid is provided to the bar raising port 182.

Fluid entering the bar raising port 182 is directed toward the counterbalance valve 142. The fluid bypasses the counterbalance valve 142 by flowing through the check valve 144. The fluid then flows out the port 146, and to the actuators 148 and 150. The fluid directs the rods of the actuators 148 and 150 to extend, thereby raising the tool bar assembly 24. As the rods extend, fluid exits the actuators 148 and 150 and flows into the fluid control system 30 via the port 152.

Fluid entering the bar raising port 182 is also directed toward the solenoid controlled valve 134. As illustrated, the solenoid controlled valve 134 is in the first position 136, thereby enabling fluid to flow through the solenoid controlled valve 134. The fluid is blocked from flowing to the conduit 112 by the relief valve 113. Moreover, the fluid flows through the conduit 132 to the conduit 155, but the fluid is blocked from flowing through the pressure sequencing valve 128 due to insufficient pressure on the pilot line 160. Fluid also flows through the check valve 153 and the restrictor 154 to rotate the second wing tool bar 44 and the fourth wing tool bar 60. Therefore, the second wing tool bar 44 and the fourth wing tool bar 60 may begin rotating from the unfolded position to the folded position.

When a sufficient pressure is applied to the pilot line 160, the pressure sequencing valve 128 transitions from the first position 156 to the second position 158, thereby enabling fluid to flow toward the actuators 72 and 74 for rotating the first wing tool bar 38 and the third wing tool bar 54. Accordingly, the wing tool bars rotate from the unfolded position toward the folded position. As previously described, the sensor 96 is used to detect the angle 104 between the central tool bar 32 and the first wing tool bar 38. When the sensor 96 detects that the angle 104 has reached a predetermined value, the sensor 96 energizes the solenoid 140. For example, the sensor 96 may include a micro switch that enables current to flow through the solenoid 140 when actuated, thereby energizing the solenoid 140. Conversely, when the micro switch is not actuated (e.g., open) current flow to the solenoid 140 is blocked, thus the solenoid 140 is de-energized. When the solenoid 140 is energized, the solenoid controlled valve 134 transitions from the first position 136 to the second position 138. In the second position 138, the solenoid controlled valve 134 blocks fluid flow from the bar raising port 182 to the conduit 132. Thus, the wing tool bars stop rotating from the unfolded position toward the folded position.

The sensor 96 may be configured to enable the wing tool bars to be lifted to a sufficient height to clear crops so that the ground engaging tools 22 do not contact the crops, such as for turning the agricultural implement 10 at a headland. Moreover, as may be appreciated, the ends of the wing tool bars may be raised more than the central tool bar 32 to account for gravitational forces acting on the tool bar. Accordingly, by providing fluid to the bar raising port 182, the tool bar assembly 24 is raised and the wing tool bars are lifted. Moreover, the sensor 96 directly coupled to the solenoid 140 directs the solenoid 140 to transition the solenoid controlled valve 134 to stop lifting the wing tool bars when the predetermined angle is reached. As such, the operator of the agricultural implement 10 does not have to check the height of the tool bar assembly 24 after fertilizing each row of crop because the tool bar assembly 24 is raised and lifted to a predetermined height.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement, comprising:
   a tool bar assembly comprising a central tool bar and a first wing tool bar rotatably coupled to a first end of the central tool bar;
   a first actuator coupled to the first wing tool bar and to the central tool bar, and configured to raise and lower the first wing tool bar relative to the central tool bar;
   a solenoid controlled valve fluidly coupled to the first actuator, wherein the solenoid controlled valve comprises a first position configured to enable fluid flow to the first actuator to raise the first wing tool bar relative to the central tool bar, and a second position configured to block fluid flow to the first actuator; and
   a switch electrically coupled to the solenoid controlled valve, wherein the switch is configured to measure an angle of the first wing tool bar relative to the central tool bar and to instruct the solenoid controlled valve to transition between the first and second positions based on the angle of the first wing tool bar relative to the central tool bar.

2. The agricultural implement of claim 1, comprising a second wing tool bar rotatably coupled to a second end of the central tool bar, and a second actuator coupled to the second wing tool bar and to the central tool bar, wherein the second actuator is configured to raise and lower the second wing tool bar relative to the central tool bar.

3. The agricultural implement of claim 2, wherein the solenoid controlled valve is fluidly coupled to the second actuator, the first position of the solenoid controlled valve is configured to enable fluid flow to the second actuator, and the second position of the solenoid controlled valve is configured to block fluid flow to the second actuator.

4. The agricultural implement of claim 1, comprising a fluid control system having the solenoid controlled valve, the fluid control system comprising a housing configured to block flow of contaminants into an interior of the fluid control system.

5. The agricultural implement of claim 1, wherein the switch comprises a micro switch.

6. The agricultural implement of claim 1, wherein the solenoid controlled valve is configured to enable fluid flow from the first actuator while the solenoid controlled valve is in the first position and the second position.

7. The agricultural implement of claim 1, wherein the first position of the solenoid controlled valve enables bidirectional fluid flow, and the second position of the solenoid controlled valve enables unidirectional fluid flow.

8. The agricultural implement of claim 1, wherein the second position of the solenoid controlled valve comprises a check valve.

9. The agricultural implement of claim 1, comprising a plurality of row units coupled to the central tool bar and the first wing tool bar, wherein the plurality of row units are configured to deliver flowable agricultural product to a field.

10. The agricultural implement of claim 1, wherein the fluid comprises a hydraulic fluid.

* * * * *